(12) United States Patent
Cohen

(10) Patent No.: US 6,754,368 B1
(45) Date of Patent: Jun. 22, 2004

(54) OBJECT RECOGNITION AND TRACKING SYSTEM

(75) Inventor: Peter Cohen, Rose Park (AU)

(73) Assignee: Beonic Corporation Pty. Ltd, Adelaide (AU)

( * ) Notice: Subject to any disclaimer, the term of this patent is extended or adjusted under 35 U.S.C. 154(b) by 0 days.

(21) Appl. No.: 09/890,241

(22) PCT Filed: Feb. 1, 2000

(86) PCT No.: PCT/AU00/00051

§ 371 (c)(1),
(2), (4) Date: Jul. 27, 2001

(87) PCT Pub. No.: WO00/46743

PCT Pub. Date: Aug. 10, 2000

(30) Foreign Application Priority Data

Feb. 1, 1999 (AU) ............................................... PP8391

(51) Int. Cl.[7] .................................................. G06K 9/00
(52) U.S. Cl. ........................ 382/103; 382/291; 348/143
(58) Field of Search ................................ 382/100, 103, 382/104, 191, 286, 291, 318; 348/135, 143, 144, 148, 149, 150, 152, 153, 159; 342/23, 27; 367/93; 250/203.1, 203.2, DIG. 1

(56) References Cited

U.S. PATENT DOCUMENTS

| | | | | |
|---|---|---|---|---|
| 5,153,722 A | * | 8/1992 | Goedeke et al. | ............ 358/108 |
| 5,512,743 A | * | 4/1996 | Shaffer et al. | ............ 250/203.6 |
| 5,517,019 A | * | 5/1996 | Lopez | ...................... 250/208.1 |
| 5,610,815 A | * | 3/1997 | Gudat et al. | .......... 364/424.027 |
| 5,699,447 A | * | 12/1997 | Alumot et al. | ............... 382/145 |
| 5,809,161 A | * | 9/1998 | Auty et al. | .................. 382/104 |
| 5,812,257 A | * | 9/1998 | Teitel et al. | .............. 356/141.4 |
| 5,864,363 A | * | 1/1999 | Giefing et al. | .............. 348/143 |
| 5,915,032 A | * | 6/1999 | Look | ........................... 382/100 |
| 6,154,133 A | * | 11/2000 | Ross et al. | ................... 340/541 |
| 6,160,494 A | * | 12/2000 | Sodi et al. | ................... 340/936 |
| 6,404,455 B1 | * | 6/2002 | Ito et al. | ..................... 348/169 |

FOREIGN PATENT DOCUMENTS

| | | | | | |
|---|---|---|---|---|---|
| AU | 28521/97 A | * | 1/1998 | .......... | G06M/1/272 |
| EP | 0 913 799 A2 | * | 5/1999 | ......... | G08B/13/194 |
| WO | WO 98/30978 A1 | * | 7/1998 | ............. | G06T/7/20 |

* cited by examiner

Primary Examiner—Andrew W. Johns

(57) ABSTRACT

An object recognition and tracking system having detector arrays (60, 70), each detector array (60, 70) including a first type of detector (95) and a second type of detector (96). The first type of detector (95) detects the presence of an object such as by changing contrast boundaries and hence objects (91, 92) that move in a detector space (90) and the second type of detector (96) focuses in on the defined object (91, 92) and to recognize, identify or record it. The detectors (95, 96) may be video, radar, microwave, radio frequency, infrared, millimeter wave, or transponder interrogators or a combination of these. Tracking of objects (91, 92) between adjoining detector spaces (90, 90) may also be done.

16 Claims, 6 Drawing Sheets

OBJECT RECOGNITION AND TRACKING SYSTEM

FIELD OF INVENTION

This invention relates to an object recognition and tracking system.

BACKGROUND

Systems have been proposed for counting objects such as people passing along a corridor in for instance a shopping centre but such systems are not adapted for recognition or discrimination of certain or different types of objects and their position and to track such objects over time.

It is the object of this invention to provide an object recognition and tracking system.

BRIEF DESCRIPTION OF THE INVENTION

In one form therefore, although this may not necessarily be the only or broadest form invention is said to reside as an object recognition and tracking system including at least one detector array, the or each detector array including a first type of detector and a second type of detector, the first type of detector being adapted to detect the presence of an object in a detector space and to define the object's position, the second type of detector being adapted to use the defined object position to identify or recognise the object or to count or to record the presence of the object if it is of a selected type.

The presence of an object as determined by the first detector may be detected by a change in contrast boundaries or by a change in pattern or by movement and hence to detect objects that move within the detector space.

The detectors may be adapted to use a portion of the electromagnetic spectrum selected from radar, microwave, radio frequency, infrared, microwave, millimetre wave, light or other portion of the electromagnetic spectrum or to use sonar or some other detection system.

The first type of detector and the second type of detector may be of the same type or they may be of different types. Hence the first type of detector may be a low resolution video system and the second type of detector may be a radio frequency detection system.

Where the first detector and the second detector are in effect the same detector the second detector may operate at a higher resolution than the first detector or be a specific identifying type.

In a preferred form of the invention the first type of detector maybe of an insect eye type. That is, a detector which is adapted to detect change in contrast between adjacent pixels in a display space rather than to identify objects absolutely. In such a form of the invention the second type of detector may be a digital signal processor detector such as a digital video detector. Hence the first type of detector acts to identify a specific region of interest within a detector space and then the digital signal processor detector need only identify the object by looking in that particular region of the space rather than by processing a whole video image of the detector space. By this means considerably less processing power is required and greater efficiencies can be obtained.

The first detector and the second detector could be the one device with the second detector acting as a second stage of the process.

Hence, in an alternate form of the invention the first and second types of detectors may be provided by a single video detector the observed image of which is handled in two different ways. In a first way the observed image may be digitised and stored in successive memory locations and then sequential images may be scanned to detect changes in the digitised image over successive frames which would indicate a moving contrast boundary. This thereby defines a moving object in the detector space and the same digital image can then be analysed in that particular region of the detector space by the second type of detector. The second type of detector could use the subsequent or previous frames to improve the recognition or result with respect to the object of interest.

If the recognition process does not reach predetermined or artificially learned threshold levels of reliability then further stored or downloaded algorithms could be used in an iterative process until the results are improved.

Whilst the first detector type is used to identify an object of interest, the second type of detector is used for recognition purposes. Each object possesses a number of characteristics such as mass, height, shape, contrast, brightness, colour, patterns, velocity, heat, reflectivity, signature and many others. Each characteristic on its own does not necessary lend itself as being a characteristic that can be used to recognise an object by itself, and some characteristics lend themselves to be more easily identified than other characteristics. A preferred part of this invention is the analysis of the most recognisable of characteristics first, then by using other characteristics and successive frames in time, at each step in the iterative analysis process, the system improves its likelihood of recognising an object with greater accuracy. The determination of which characteristics are analysed first and the sequence of which they are analysed is a most preferred part of this invention.

In an alternate form of the invention, the system may be built with artificial intelligence to make these decisions without external intervention. In this case, the system determines which characteristic would be analysed first. As time progresses, the system may identify new characteristics or a new sequence of characteristics that may better identify an object of interest and therefore become self-improving. In this case, self improved procedures, or algorithms are stored with an existing memory resident library for future reference. The system would use artificial intelligence analysis to decide which algorithm is more suited by its success and speed of recognition using probability analysis.

Generally, therefore, the invention discloses a system which may be broken down into a number of stages. The first stage of the process would include an object detection engine to capture and load the digitised image sequences from the hardware into an appropriate digital format for the object recognition engine. The first type of detector may identify the boundary of an object as determined over successive frames as the object moves across the detector space. The second type of detector, which could form a second stage of the system would be an object recognition engine used to, firstly, convert certain characteristics into useful mathematical images or algorithms, and secondly, may be used to perform and record results over time necessary to analyse specific characteristics of the objects in question. The characteristics under analysis may include but would not be limited to one or more of items such as the mass, height, shape, colour, pattern, contrast, texture, heat, reflectivity, frequency, velocity, signal radiation, signature etc. Each characteristic of the detected object is given a chance of probability of being an object of interest. To obtain higher levels of accuracy, successive digitised images may be analysed over time using stored procedures, stored libraries, analysis algorithms and an iterative analysis process which can manage the observation of multiple characteristics from multiple objects in real-time.

Each analysis iteration increases (or decreases as the case may be) the chance of a detected object being an object of interest. If the level of probability reaches a predetermined level of acceptance or threshold level, the object is recognised as an object of interest. To improve the probability analysis, additional kinds of the second type of detector could be included within a single detector space used to view different characteristics of an object of interest to improve the probability of recognising an object.

Additional detectors types may be positioned in different locations and facing a different angles but mounted to view the same detector space to improve the chance of differentiating objects, placing or positioning objects in a three dimensional space or locating an object which would otherwise be obscured by the use of only one detector type.

The second type of detector may be adapted to interrogate an interrogatable device associated with the object. In one such embodiment the first detector may be adapted to observe that a an object is moving within a detection space and then the interrogation device of the second detector is adapted to interrogate an rf signature chip such as a smart card chip or transponder to provide a positive identification of the object and its passage through the detection space.

The object recognition and tracking system may further, include multiple detector arrays, multiple detector types and multiple detector spaces.

The detector array may be arranged to communicate with adjoining detector arrays in a multiple detector space to pass on or receive information it has received or learnt. This transmission of information could be conducted over a closed network such as an intranet or over an open network such as the internet. Decisions or information would be passed onto successive detectors or other third party devices requiring such information to activate as necessary programmed actions. The detectors may make decisions, give instructions or initiate some other form of activity without human intervention.

A third stage of the system may be performed by the tracking engine. Having recognised an object of interest, the tracking engine may perform such tasks as grid initialisation, 2D or 3D mapping, allocation of a tag, tag tracking and tag handover in successive detection spaces. This requires substantially less processing power than the object recognition engine as the identified and tagged object moves across one detector space into another. If an object appears in a successive detector space which was not previously detected because of an obscurity from another object, the process may be back tracked through all possible recorded image frames and the records may be adjusted accordingly. The entire system is updated with this new information. This substantially increases the accuracy of the system. From this point in time onwards, the object may be tracked until it moves out of all detection spaces. Having recognised the type of the object required to be tracked, the position of each object of interest is subsequently mapped onto a universal grid over time. As the processing power required for tracking is substantially reduced in successive detector spaces, multiple objects may be tracked with a high level of accuracy and reliability.

In a preferred form of the invention there may be multiple detector arrays, multiple detector types and multiple detector spaces in two dimensional or three dimensional space and the recognition and tracking system may include means to communicate with adjacent detector arrays to hand over tracking of a selected object from one detector space to an adjacent detector space and to record the movement of the object over time.

By this means the system may be able to track moving objects of a selected type within a much larger area than a single, detector space. This could be of use for instance if the requirement is to tracks objects throughout a shopping centre as well as individual detector spaces such as a display area.

It will be noted that as objects which are not moving in the detector space such as items of furniture or other fixed objects are not observed by the first type of detector which only observes moving contrast boundaries or changes for instance between adjacent frames of a video image and therefore are not tracked or observed by the second detector. This would save considerable processing power.

It will be realised that if the detector array is provided in the ceiling of a building looking substantially downwards in a corridor for instance an object when directly below the detector will have a certain profile but when the object is moving through the detector space the observed profile from a fixed detector array will vary with the angle observance and hence in one preferred form of the invention the processing arrangement to identify a moving object in the detector space may include means to take into account the angle of the object from the detector array or the movement of objects off centre within the space.

The object recognition and tracking system may have its or some of the detector arrays mounted to a side of its respective detection space such as on a wall defining a boundary of a detection space or in a corner of a detection space.

The object recognition and tracking system of the present invention may be used for counting people in supermarkets or the like or for traffic travelling along a road, for security monitoring and surveillance applications and to determine human preferences when walking through a shop or display area or to determine how many people are located within a three dimensional space such as a room or region.

The object recognition and tracking system of the present invention may be used to track seemingly random movements to determine patterns or trends over time.

The detector system of the present invention may be used as a surveillance system with a human interface to create a readable image of what the detector is viewing such as a video camera would.

It should be noted that the detector array could be mounted on a moving device such as a motor vehicle and its observations being related to stationary objects such as street signs or stop lights. It may be used to detect the presence of pedestrians.

This then generally describes the invention but to assist with understanding reference will now be made to the accompanying drawings which show a preferred embodiment of the invention.

DETAILED DESCRIPTION OF PREFERRED EMBODIMENTS OF THE INVENTION

Figure 1:
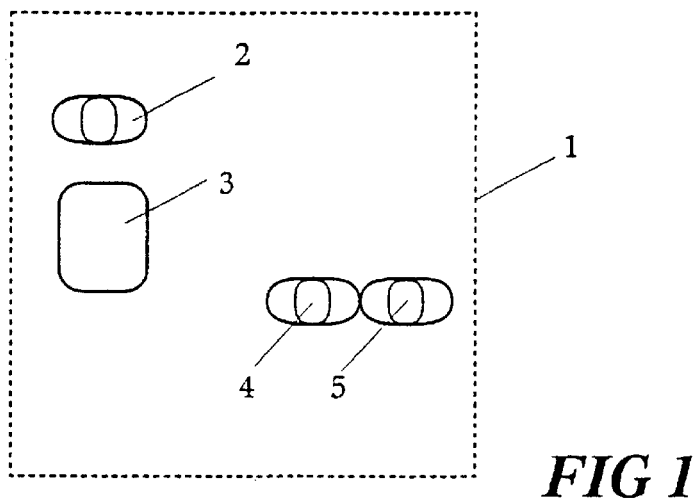
FIG. 1 shows a detector space with some objects within the detector space.
Figure 2:
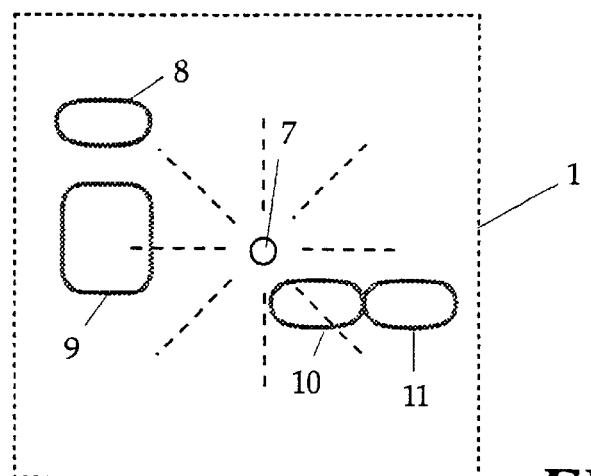
FIG. 2 shows the objects and the regions which are observed by the first detector type.
Figure 3:
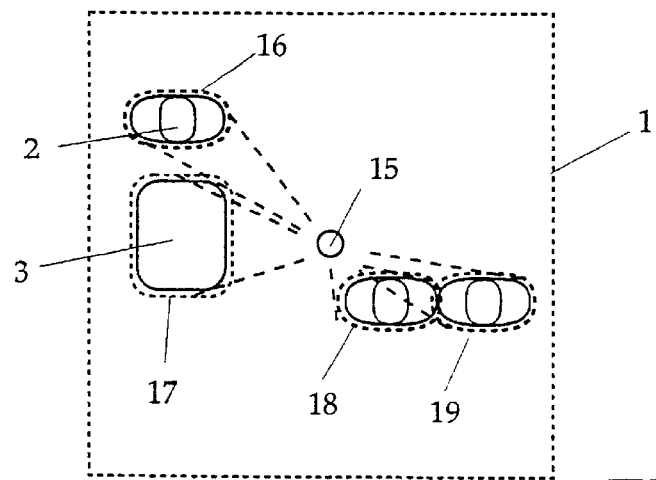
FIG. 3 shows the detector region and the detection done by the second type of detector.

Now looking more closely at the drawings and the arrangements shown in FIGS. 1 to 3 it will be seen that in the detector space 1 there are a number of objects. A first object is a person 2 pushing a trolley 3 and further objects are two persons 4 and 5 moving close together.

As can be seen in FIG. 2 the only parts of the objects detected by the first type of detector 7 are the boundary 8 of the person 2, the boundary 9 of the trolley 3 and the boundaries 10 and 11 of the persons 4 and 5.

The information about these boundaries defining regions to be observed in detail is transmitted to the second type of detector 15 and the observed image such as a digitised video image is only observed in the region shown by the dotted lines.

Region 16 is observed to identify the object 2, region 17 is observed to identify the trolley 3 but as the trolley is not an object which is to be counted the processing arrangement for the tracking system discounts the trolley 3 and does not count it. The two persons 4 and 5 are observed by observing the regions 18 and 19 and are identified as two persons walking together.

This invention therefore in this observed space counts 3 persons moving within the space and ignores the fourth object, the trolley.

Figure 4:
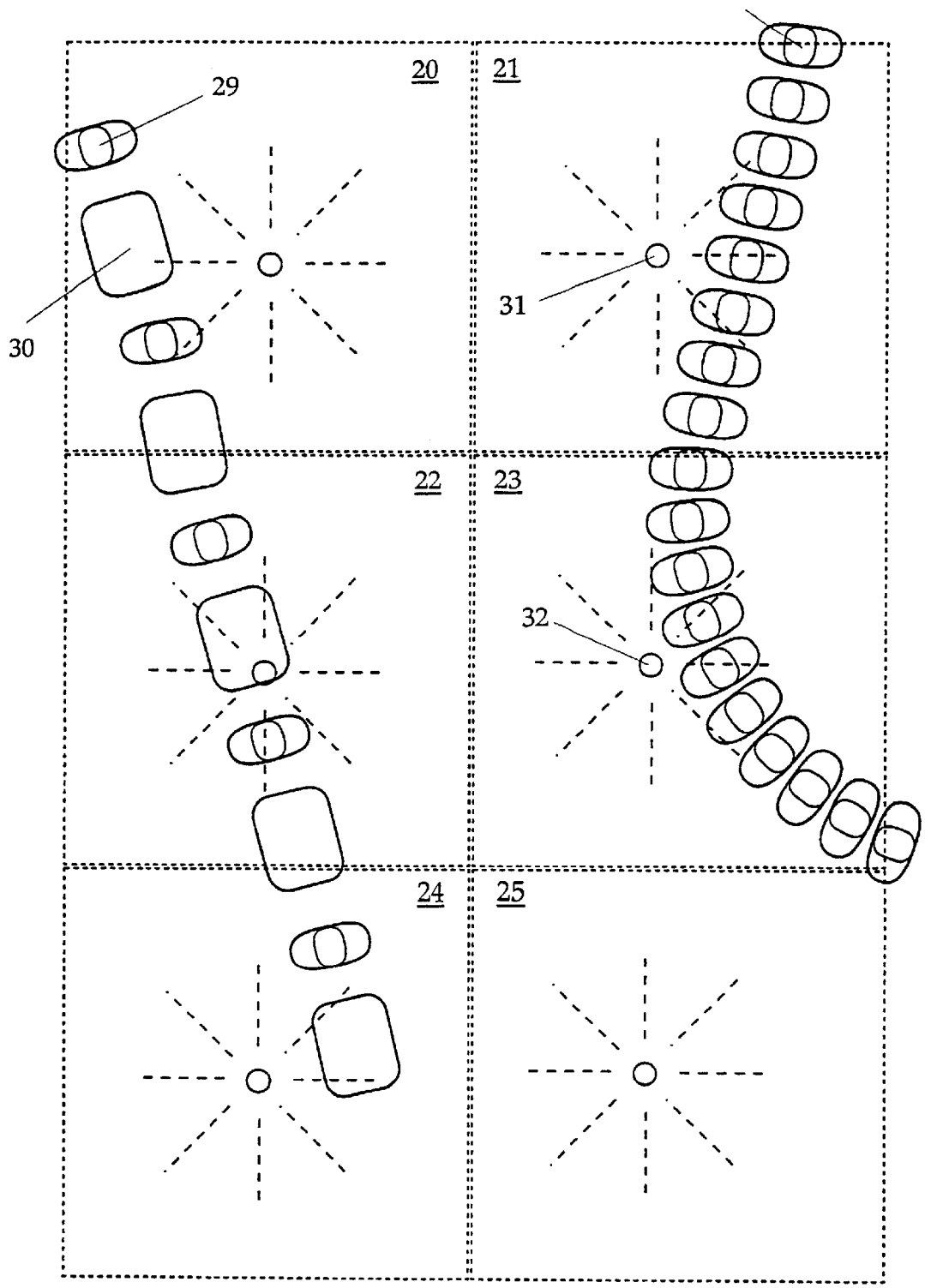
FIG. 4 shows an enlarged detector space with multiple detector arrays and objects moving through the detector space.

In FIG. 4 it will be seen that there are six detector spaces 20, 21, 22, 23, 24 and 25. A person 28 enters the detector space 21 and passes through this space into detector space 23 and then passes out of detector space 23 at the corner of detector space 23 with detector space 25. A person pushing a trolley enters detector space 20 and moves diagonally across into detector space 22 and then into detector space 24.

The detector array 31 in detector space 21 observes and notionally tags the person entering the detector space and tracks it across its detector space and then provides information to the detector array 32 in detector space 23 that a person is entering at a defined location and the detector array 32 continues to track the tagged person until he leaves that detector space. The continual movement of that person is observed so that a record can be followed to determine why that person may have turned in detector space 23 rather than continuing straight on. By observing a number of people moving in the various detector spaces some trends may be observed which may give some indication as to why such an action may occur. The person 29 pushing the trolley 30, however, has moved in a straight line from one detector space to the next. The hand-over arrangement is such, however, that the person 28 is only counted once even though he or she has been in two detector spaces and the person 29 is counted only once even though he or she has been in three detector spaces. The trolley 30 is not counted at all because the detector arrangements are adapted to observe persons moving only.

It will be realised of course that for other detector arrangements it may be moving trolleys or vehicles which are to be observed and persons may be ignored.

Figure 5:
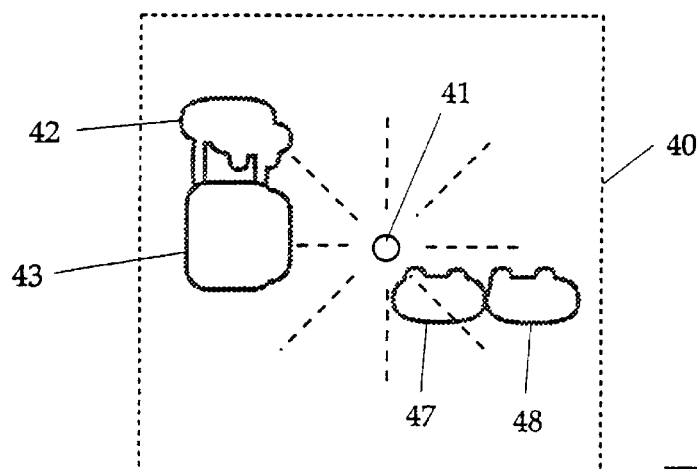
FIG. 5 shows a more realistic position of objects observed by the first type of detector in a detector space.
Figure 6:
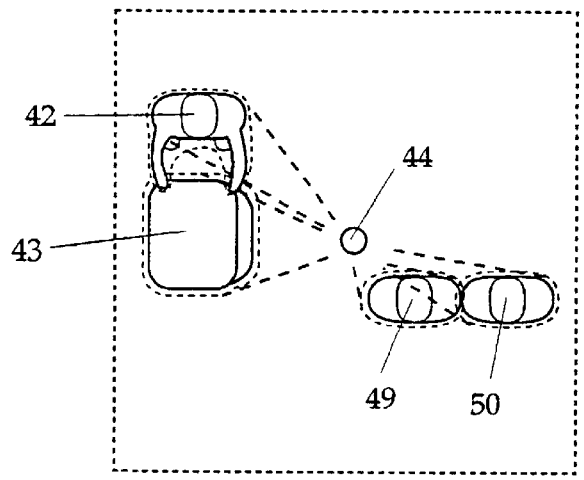
FIG. 6 shows the objects of FIG. 5 observed by the second type of detector.

FIGS. 5 and 6 show a more realistic arrangement where within a detector space 40 a first type of detector array 41 observes an irregularly shaped object 42 and another irregularly shaped object 43. This is because the objects being observed are not directly below the detector array 41 and as only moving contrast boundaries are observed a rather irregular contrast boundary is defined in each case. Details of that object boundary are transferred to the second array 44 as shown in FIG. 6 and only a limited area is observed and by which it is determined that given the angle of observation that the object moving 42 is in fact a person and the object 43 is a trolley. Similarly in FIG. 5 the two objects 47 and 48 are somewhat irregularly shaped but given their angle from the detector 41 they are identified as persons 49 and 50.

Figure 7:
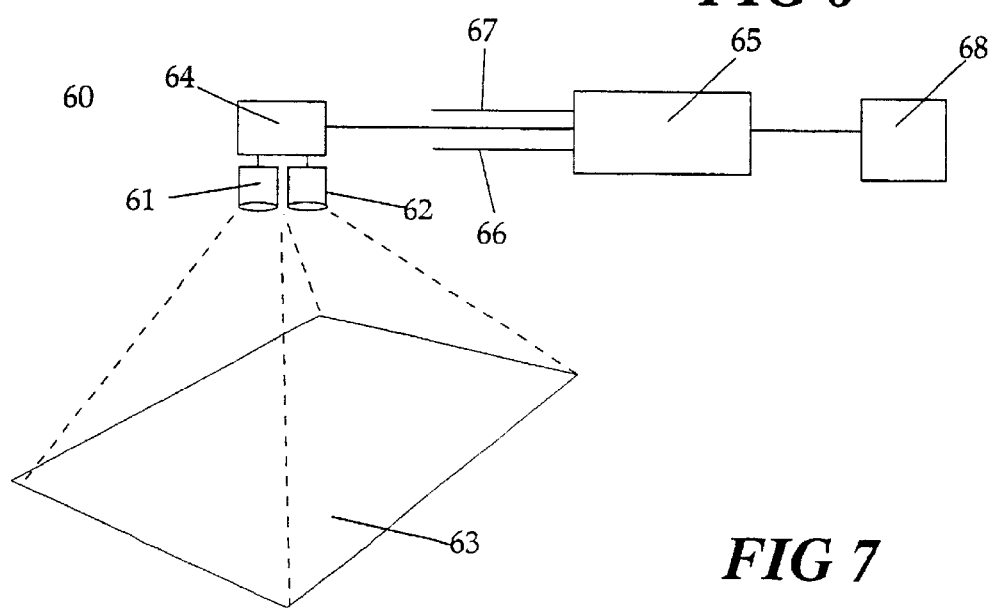
FIG. 7 shows a schematic diagram of a recognition and tracking system according to the present invention.

As can be see in FIG. 7 a detector array 60 comprises a first type of detector 61 and a second type of detector 62 observing a detector space 63. A primary signal processor 64 associated with the detector array receives and processes the signals from the first type of detector 61 and sends instructions to the second type of detector 62 as to what to observe within the space. Details of the relevant observations are transferred to a central point 65 which also receives information from adjoining detector arrays on lines 66 and 67 and enables the tracking of objects between adjacent detector spaces. Relevant information such as counts are provided to another detector array or device on the network or to a counting arrangement 68.

Figure 8:
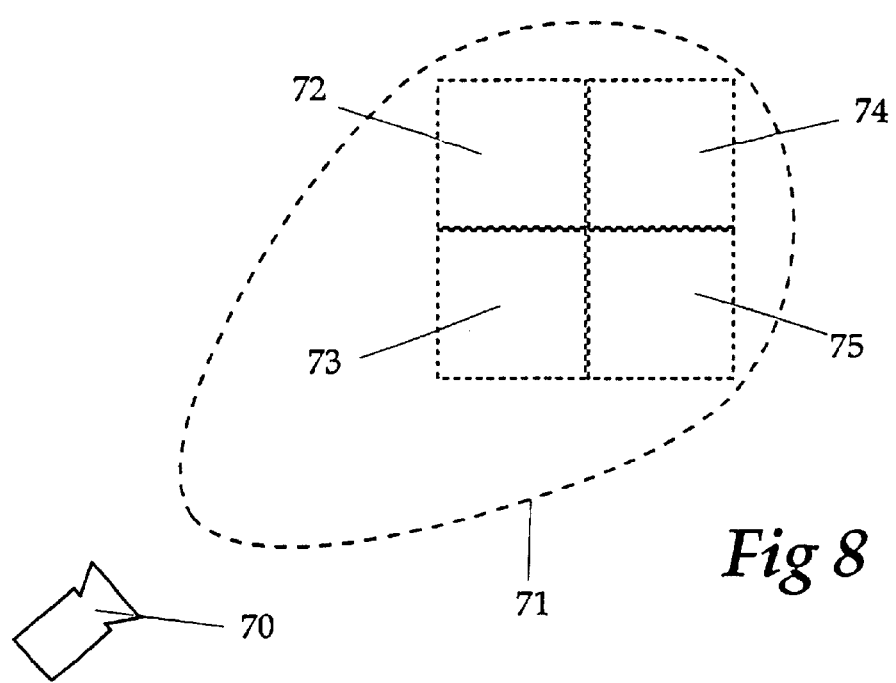
FIG. 8 shows a schematic diagram of a detection system according to an alternative embodiment of the present invention.

In FIG. 8 a detector array 70 is to one side of a detection space and has a footprint 71 which encompasses a detection space comprising four sectors 72, 73, 74, and 75. In this embodiment the detector array 70 provides both the first type of detector and the second type of detector and can detect in multiple detector spaces represented by the four sectors 72, 73, 74, and 75.

Figure 9:
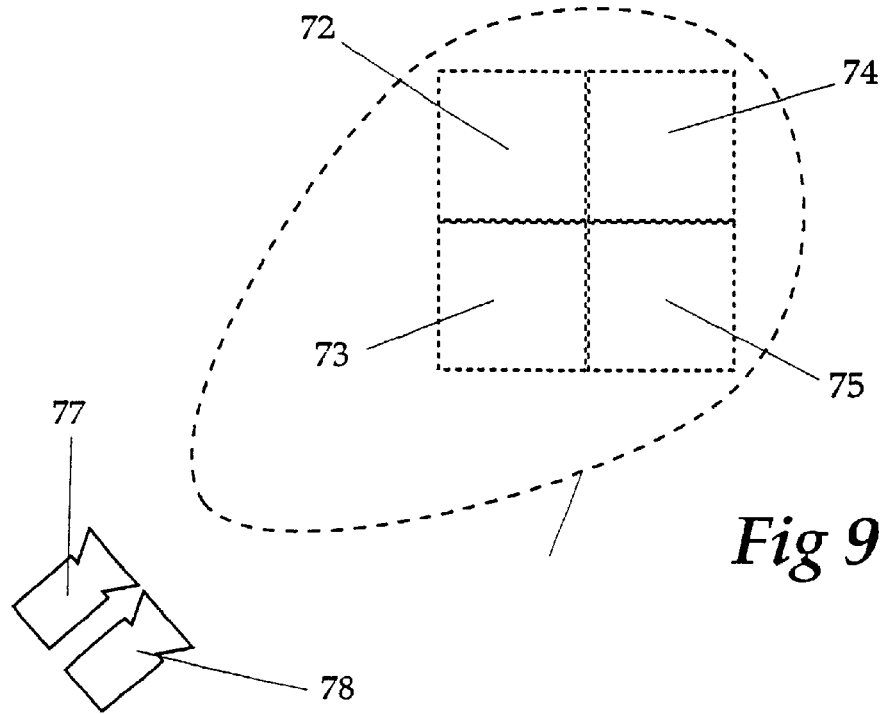
FIG. 9 shows a schematic diagram of a detection system according to an alternative embodiment of the present invention.

In FIG. 9 a detector array 76 has substantially the same arrangement as in FIG. 8 with a footprint 71 which encompasses a detection space comprising four sectors 72, 73, 74, and 75. In this embodiment the detector array 70 has a first type of detector 77 and a separate second type of detector 78. Hence the first type of detector 77 can detect movement of objects in multiple detector spaces represented by the four sectors 72, 73, 74, and 75 and the second type of detector 78 can identify the or each object.

Figure 10:
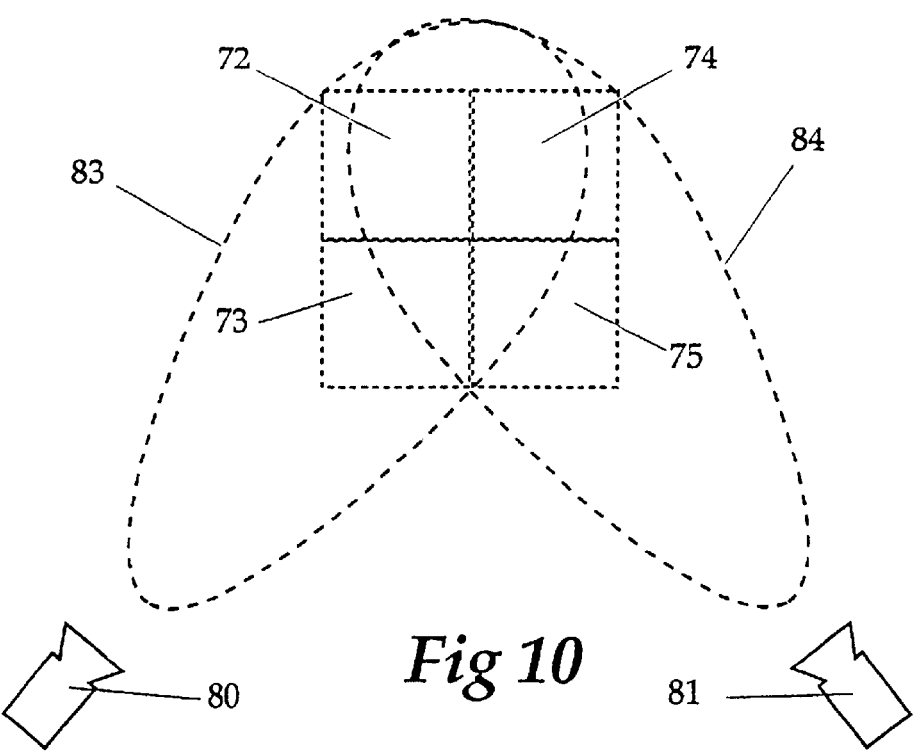
FIG. 10 shows a schematic diagram of a detection system according to an alternative embodiment of the present invention.

FIG. 10 shows a detector array arrangement in which there are two detector arrays 80 and 81 each to the side of a detection space comprising four sectors 72, 73, 74, and 75. The detector array 80 has a footprint 83 which enables the detection and identification of objects within the sectors 72 and 73 of the detector space. The detector array 81 has a footprint 84 which enables the detection and identification of objects within the sectors 74 and 75 of the detector space.

Figure 11:
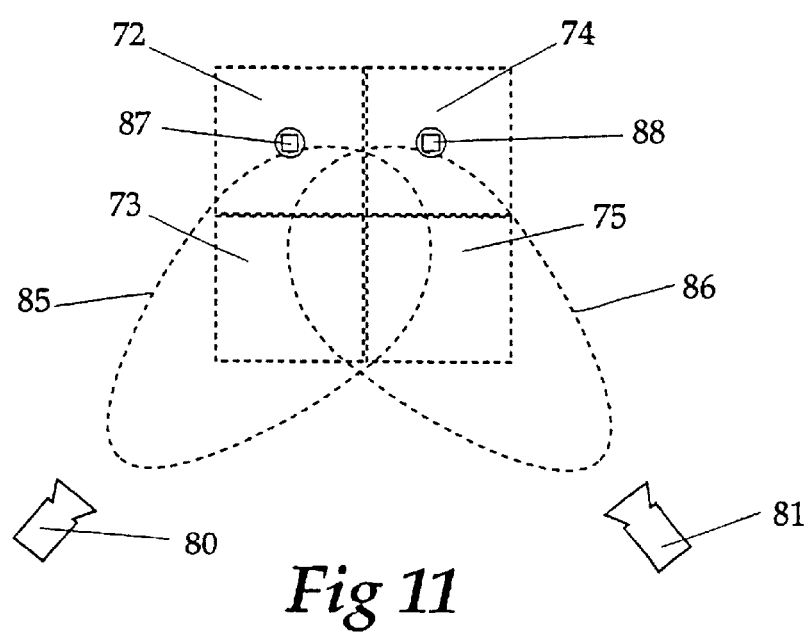
FIG. 11 shows a schematic diagram of a detection system according to an alternative embodiment of the present invention.

In FIG. 11 detector arrays 80 and 81 have has substantially the same arrangement as in FIG. 10 with respective footprints 85 and 86 but these only allow detection in the sectors 73 and 75 respectively whereas the detection in the sectors 72 and 74 is provided by respective overhead detector arrays 87 and 88.

Figure 12:
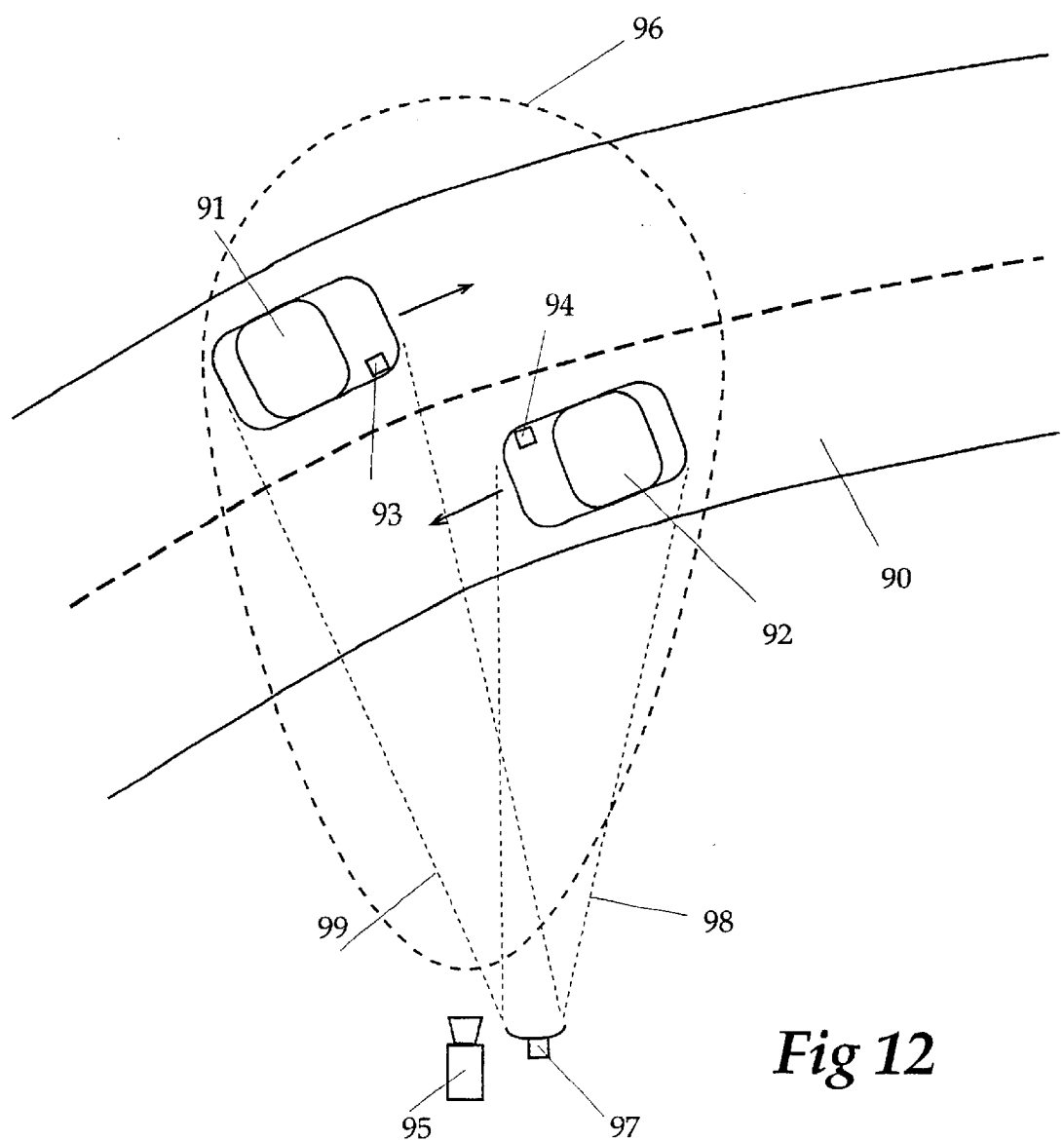
FIG. 12 shows a schematic diagram of a detection system according to an alternative embodiment of the present invention using a transponder signature identification system.

FIG. 12 shows a roadway 90 along which are travelling two cars 91 and 92. The cars 91 and 92 are travelling in different directions along the road. The car 91 has a transponder chip 93 mounted on it and the car 92 has a transponder chip 94 mounted on it. To one side of the roadway 90 is a detector array comprising a first detector such as a video detector 95 operating in the infrared region of the electromagnetic spectrum and a second microwave detector 97 adapted to interrogate the transponders 93 and 94. The footprint 96 of the video detector 95 covers both sides of the road and hence can detect the moving cars 91 and 92. As each car is detected the second microwave detector 97 is actuated to interrogate with focussed beams 99 and 98 respectively the transponders 93 and 94 respectively. By this means not only the fact that a particular car has passed a given point be recorded but also the direction of travel can be recorded. Without the first detection stage the detector array could record that a transponder had passed a given point but the direction of travel would not be recorded.

Throughout this specification various indications have been given as to the scope of this invention but the invention is not limited to any one of these but may reside in two or more of these combined together. The examples are given for illustration only and not for limitation.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

What is claimed:

1. An object recognition and tracking system including at least one detector array, the or each detector array including a first type of detector and a second type of detector, the first type of detector being adapted to detect the presence of an object in a detector space and to define the object's position, the second type of detector being adapted to use the defined object position to identify or recognize the object or to count or to record the presence of the object if it is of a selected type, the first detector and the second detector being the same detector, the second detector focussing or operating at a higher resolution than the first detector.

2. An object recognition and tracking system as in claim 1 wherein the presence of an object as determined by the first detector may be detected by a change in contrast boundaries or by a change in pattern or by movement and hence to detect objects that move within the detector space.

3. An object recognition and tracking system as in claim 1 wherein the detector array is adapted to use a portion of the electromagnetic spectrum selected from radar, microwave, radio frequency, infrared, microwave, millimeter wave or light or to use sonar or some other detection system.

4. An object recognition and tracking system as in claim 1 wherein the first and second types of detectors are provided by a single video detector the observed image of which is handled in two different ways, in a first way the observed image may be digitised and the sequential images scanned to detect changes in the digitised image over successive frames which would indicate the presence of an object and in a second way the same digital image can then be analysed in more detail in a particular region of the detector space.

5. An object recognition and tracking system as in claim 1 wherein the second type of detector is adapted to use subsequent or previous frames to improve the recognition or result with respect to the object of interest.

6. An object recognition and tracking system as in claim 1 wherein one or more of characteristics such as mass, height, shape, contrast, brightness, colour, patterns, velocity, heat, reflectivity, signature are used to define and identify an object.

7. An object recognition and tracking system as in claim 1 further including artificial intelligence to assist with defining or identifying an object.

8. An object recognition and tracking system as in claim 1 further including a third stage of the system performed by a tracking engine being adapted to track a defined object.

9. An object recognition and tracking system as in claim 1 further including multiple detector arrays and multiple detector spaces.

10. An object recognition and tracking system as in claim 9 further including means to communicate between detector arrays to hand over tracking of a selected object from one detector space.

11. An object recognition and tracking system as in claim 10 wherein the means to communicate between detector arrays includes means to pass information to successive detectors or other third party devices requiring such information to activate as necessary programmed actions without human intervention.

12. An object recognition and tracking system as in claim 1 further including means to take into account the angle of the object from the detector array.

13. An object recognition and tracking system as in claim 1 wherein the or each detector array is mounted substantially over its respective detection space.

14. An object recognition and tracking system as in claim 1 wherein the or each detector array is mounted to a side of its respective detection space.

15. An object recognition and tracking system as in claim 1 used for counting people in supermarkets or the like or for traffic traveling along a road, for security monitoring and surveillance applications and to determine patterns or trends from seemingly random movements over time such as when walking through a shop or display areas.

16. An object recognition and tracking system as in claim 1 used on a moving vehicle to detect objects which are relatively stationary with respect to the vehicle.

* * * * *